United States Patent
Aizono

(10) Patent No.: US 9,308,457 B2
(45) Date of Patent: Apr. 12, 2016

(54) GAME PROGRAM AND INFORMATION PROCESSING DEVICE

(71) Applicant: DeNA Co., Ltd., Tokyo (JP)

(72) Inventor: Takashi Aizono, Tokyo (JP)

(73) Assignee: DeNA CO., LTD., Tokyo (JP)

( * ) Notice: Subject to any disclaimer, the term of this patent is extended or adjusted under 35 U.S.C. 154(b) by 2 days.

(21) Appl. No.: 14/621,198

(22) Filed: Feb. 12, 2015

(65) Prior Publication Data

US 2015/0231500 A1 Aug. 20, 2015

(30) Foreign Application Priority Data

Feb. 18, 2014 (JP) ................................. 2014-028081

(51) Int. Cl.
| | |
|---|---|
| *A63F 9/00* | (2006.01) |
| *A63F 13/55* | (2014.01) |
| *A63F 13/537* | (2014.01) |
| *A63F 13/422* | (2014.01) |
| *A63F 13/426* | (2014.01) |
| *A63F 13/833* | (2014.01) |
| *A63F 13/2145* | (2014.01) |

(52) U.S. Cl.
CPC ............. *A63F 13/55* (2014.09); *A63F 13/2145* (2014.09); *A63F 13/422* (2014.09); *A63F 13/426* (2014.09); *A63F 13/537* (2014.09); *A63F 13/833* (2014.09)

(58) Field of Classification Search
None
See application file for complete search history.

(56) References Cited

U.S. PATENT DOCUMENTS

| 6,162,120 A | * | 12/2000 | Takahashi et al. | ................. 463/8 |
|---|---|---|---|---|
| 8,382,591 B2 | * | 2/2013 | Toy et al. | .......................... 463/37 |
| 8,678,927 B2 | * | 3/2014 | Hammontree et al. | ......... 463/37 |
| 2006/0035693 A1 | * | 2/2006 | Kobaysahi et al. | ................ 463/8 |
| 2009/0191946 A1 | * | 7/2009 | Thomas et al. | .................. 463/20 |
| 2010/0041480 A1 | * | 2/2010 | Wong et al. | ...................... 463/37 |
| 2010/0302190 A1 | * | 12/2010 | Yeh | ................................ 345/173 |
| 2011/0285636 A1 | * | 11/2011 | Howard et al. | ............... 345/173 |

(Continued)

FOREIGN PATENT DOCUMENTS

| JP | 2000-288245 A | 10/2000 |
|---|---|---|
| JP | 3839354 B | 11/2006 |

(Continued)

OTHER PUBLICATIONS

"Ultra Street Fighter IV/Game Systems" Sep. 9, 2013. <http://wiki.shoryuken.com/Ultra_Street_Fighter_IV/Game_Systems> (USF from hereinafter).*

(Continued)

*Primary Examiner* — Seng H Lim
(74) *Attorney, Agent, or Firm* — Procopio, Cory, Hargreaves & Savitch LLP

(57) ABSTRACT

To improve the operating characteristics of character manipulation on touchscreen panels while at the same time providing a compact display of the control areas on a game screen. When a first operation is accepted as input by allowing a player to select any single area among multiple unit areas with a touch gesture on a game screen, or when a second operation is accepted as input by allowing a player to select any two or more areas among multiple unit areas in a successive manner, the inventive game program directs a computer to execute a process that determines the actions that a player-operated character is directed to perform respectively in response to the first operation and the second operation.

5 Claims, 6 Drawing Sheets

(56) References Cited

U.S. PATENT DOCUMENTS

| | | | |
|---|---|---|---|
| 2011/0300934 A1* | 12/2011 | Toy et al. | 463/31 |
| 2011/0314093 A1* | 12/2011 | Sheu et al. | 709/203 |
| 2013/0190083 A1* | 7/2013 | Toy et al. | 463/31 |
| 2013/0324242 A1* | 12/2013 | Vincent et al. | 463/31 |

FOREIGN PATENT DOCUMENTS

| | | | |
|---|---|---|---|
| JP | 2007-102503 A | 4/2007 | |
| JP | 2007-130367 A | 5/2007 | |
| JP | 2012-133481 A | 7/2012 | |
| JP | 2013-013672 A | 1/2013 | |

OTHER PUBLICATIONS

Japanese Patent Application No. 2014-028081: Decision to Grant mailed on Sep. 30, 2014.

Japanese Patent Application No. 2014-028081: Office Action mailed on May 27, 2014.

4Gamer.net, 3D fighting game, Smart fighter, Aetas, Inc., Sep. 25, 2012, Sep. 19, 2014, <URL http://www.4gamer.net/games/185/G018598/20120925084/>.

* cited by examiner

FIG. 4

| Control Buttons | Locomotion | Defense |
|---|---|---|
| 11 | Jump left | Defend against attack from the right side |
| 12 | Jump vertically | — |
| 13 | Jump right | Defend against attack from the left side |
| 21 | Move left | Defend against attack from the right side |
| 22 | — | — |
| 23 | Move right | Defend against attack from the left side |
| 31 | Move left while crouching | Defend against attack from the right side |
| 32 | Crouch in place | — |
| 33 | Move right while crouching | Defend against attack from the left side |

FIG. 5

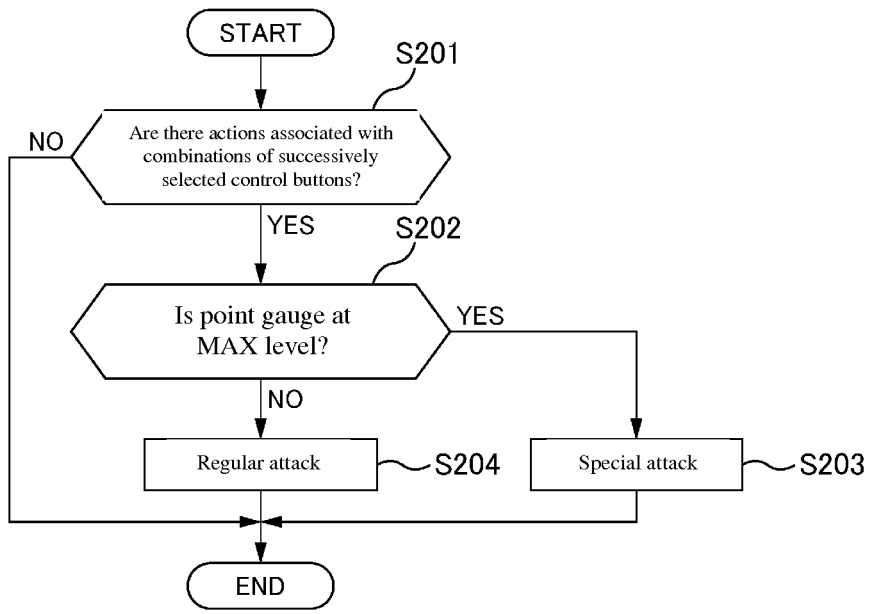

| Attack technique number | Combination of control buttons | Regular attack (attack strength) | Special attack (attach strength) |
|---|---|---|---|
| 1 | 11→12→13 | Upper punch (10) | Strong upper punch (30) |
| 2 | 21→22→23 | Straight punch (10) | Strong straight punch (30) |
| 3 | 31→32→33 | Low kick (10) | Strong low kick (30) |
| ⋮ | ⋮ | ⋮ | ⋮ |
| 10 | 31→32→22→12 | Rising uppercut (50) | Strong rising uppercut (30) |
| ⋮ | ⋮ | ⋮ | ⋮ |

GAME PROGRAM AND INFORMATION PROCESSING DEVICE

The present application claims the benefit of foreign priority under 35 USC 119(a) based on Japanese Patent Application No. 2014-028081, filed on Feb. 18, 2014, the contents of which is incorporated herein in its entirety by reference.

TECHNICAL FIELD

The present invention relates to a game program and an information processing device.

BACKGROUND ART

Game programs are known, in which the actions of a character displayed on a game screen are controlled in response to the operations of a player when said player operates cursor keys and attack buttons provided on the control panel of a game machine (for example, see Patent citation 1).

PRIOR ART LITERATURE

Patent Citations

[Patent Citation 1]
Japanese Patent Publication No. 3839354

SUMMARY OF THE INVENTION

Problems to be Solved by the Invention

In recent years, players have been able to play games using not only game machines, but also smartphones, tablet terminals, and the like. In such cases, a player can actuate a character displayed on a game screen by performing touchscreen operations on the images of the cursor keys and attack buttons displayed on the right- and left-hand side of the game screen. However, when the images are displayed separately on the right- and left-hand side of the game screen, as is the case with such cursor keys and attack buttons, there is a risk that the footprint of the control areas on the game screen may increase and make the character difficult to see, for instance, thereby complicating operation for the player.

The present invention has been devised by taking such circumstances into consideration with the object of improving the operating characteristics of character manipulation on touchscreen panels while at the same time providing a compact display of the control areas on the game screen.

Means for Solving the Problems

The main aspect of the present invention aimed at solving the above-mentioned problem is a game program (e.g., non-transitory computer readable medium including instructions stored in a memory that are executed by a processor) used to run a game by responding to a player's operations on a touchscreen panel, wherein said game program directs a computer to execute: a screen generation process, which generates a game screen including a character area having player-operated characters located therein and a control area having multiple unit areas located therein; an acceptance process which, upon display of the game screen, accepts a first operation as input by allowing the player to select any single area among the multiple unit areas with a touch gesture on the game screen, and a second operation is accepted as input by allowing the player to select any two or more areas from the multiple unit areas in a successive manner; and a character action determination process which, upon acceptance of the first operation or the second operation as input, determines the action that the character is directed to perform in the character area in response, respectively, to the first operation and the second operation.

Other features of the present invention will become apparent from this Description and the accompanying drawings.

BRIEF DESCRIPTION OF THE DRAWINGS

FIG. 4 A diagram illustrating the correspondence between a first operation and the actions of the character.

FIG. 5 A flow chart illustrating a second character action determination process.

BEST MODE FOR CARRYING OUT THE INVENTION

Figure 1:
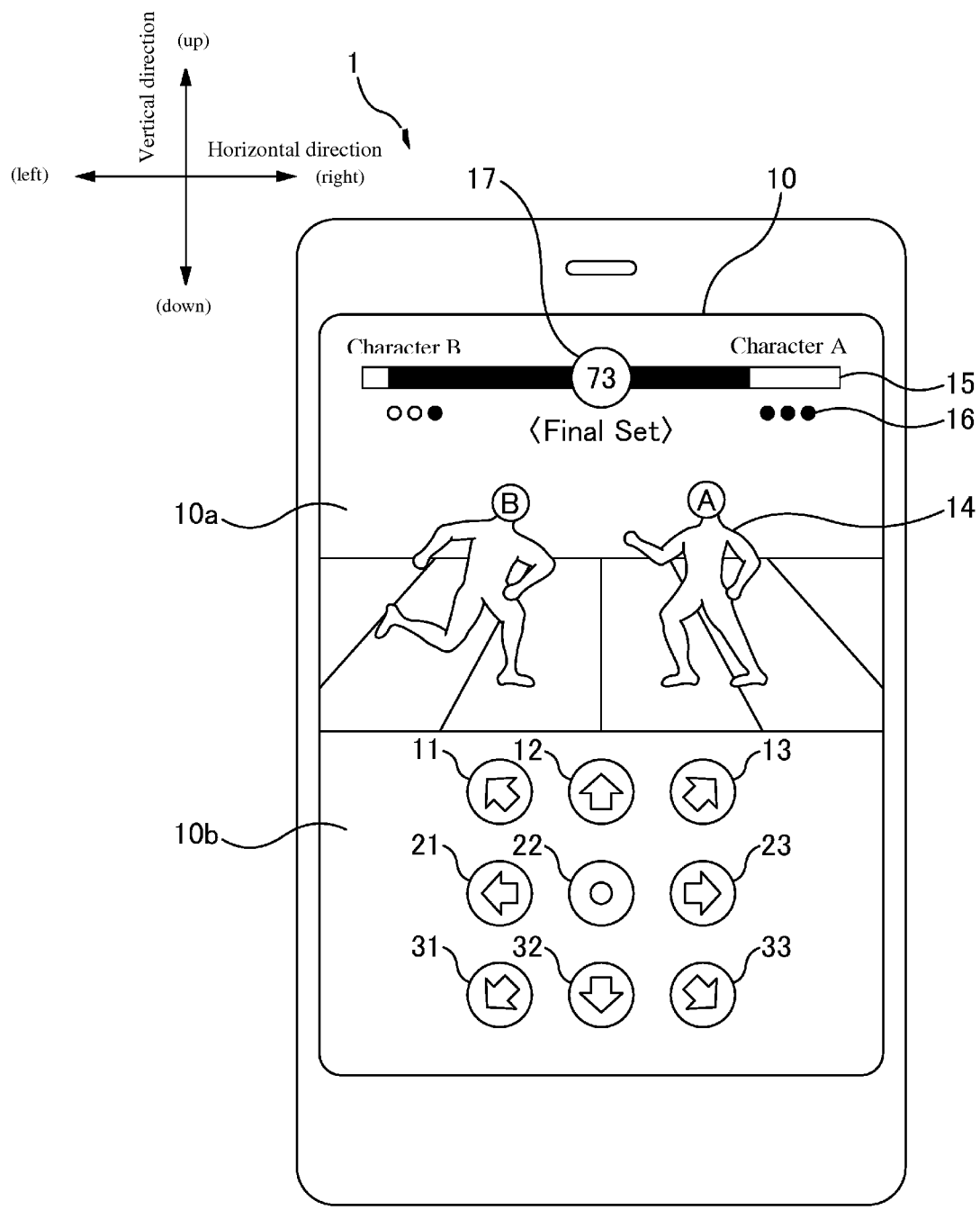
FIG. 1 A schematic diagram showing an exemplary configuration of a player terminal 1.

At least the following will become apparent from this Description and the accompanying drawings.

Namely, a game program used to run a game by responding to a player's operations on a touchscreen panel, wherein said game program directs a computer to execute: a screen generation process, which generates a game screen including a character area having player-operated characters located therein and a control area having multiple unit areas located therein; an acceptance process which, upon display of the game screen, accepts a first operation as input by allowing the player to select any single area from the multiple unit areas with a touch gesture on the game screen, and, at the same time, accepts a second operation as input by allowing the player to select any two or more areas among the multiple unit areas in a successive manner; and a character action determination process which, upon acceptance of the first operation or the second operation as input, determines the action that the character is directed to perform in the character area respectively in response to the first operation and the second operation.

This type of game program can provide a compact display on a game screen because there is no need to display images for each functionality separately on the right- and left-hand side of the game screen, as is the case with the conventional cursor keys and attack buttons. In addition, when a player directs a character to perform an action corresponding to a first operation (e.g., locomotion) using conventional cursor keys and attack buttons, a touch gesture must be performed by choosing a cursor key on the left-hand side of the game screen, and, on the other hand, when a player directs a character to perform an action corresponding to a second operation (e.g., an attack), a touch gesture must be performed by choosing an attack button on the right-hand side of the game screen, and so forth. By contrast, in accordance with the present game program, both when a character is directed to perform an action corresponding to a first operation and when a character is directed to perform an action corresponding to a second operation, the only thing the player needs to do is to perform a touch gesture in a control area having multiple unit areas located therein, which makes it possible to improve the operating characteristics of character manipulation on touchscreen panels.

In addition, this game program may be adapted such that, upon acceptance of the second operation as input during the acceptance process, the character action determination process determines that the action that the character is directed to perform is an action of a higher level as the number of the unit areas successively selected by the player is increased.

Such a game program favors players who perform more complex operations.

In addition, this type of game program may be adapted such that upon acceptance of the second operation as input during the acceptance process, the character action determination process determines the action that the character is directed to perform only if the number of the unit areas successively selected by the player is three or more.

Since there is still a chance of erroneous operation if two unit areas are successively selected by the player, this game program makes it possible to avoid situations in which characters end up performing operations contrary to the player's intentions.

In addition, this game program may be adapted such that a control area is formed by arranging nine of said unit areas in three rows and three columns, and the character action determination process, upon acceptance of the first operation as input during the acceptance process, determines that the action that the character is directed to perform is an action associated with the horizontal direction if the unit areas located in either of the first or third column are selected from among the nine unit areas arranged in three rows and three columns, and, at the same time, determines that the action that the character is directed to perform is an action associated with the vertical direction if the unit areas located in either of the first or third row are selected, and, upon acceptance of the second operation as input during the acceptance process, determines the action that the character is directed to perform depending on the combination of the unit areas successively selected from the nine unit areas arranged in three rows and three columns.

Such a game program can provide a more compact display by displaying conventional cursor keys and attack buttons together at a single location, with the buttons superimposed on the keys. In addition, since there is no need to operate them with both hands like the conventional cursor keys and attack buttons, and they can be readily operated with a single hand, it becomes possible to improve the operating characteristics of character manipulation on touchscreen panels.

In addition, another aspect is an information processing device running a game by responding to a player's operations on a touchscreen panel, wherein said information processing device is provided with: a screen generation processing unit, which is used to generate a game screen including a character area having player-operated characters located therein and a control area having multiple unit areas located therein; an acceptance processing unit which, upon display of the game screen, accepts a first operation as input by allowing the player to select any single area among the multiple unit areas with a touch gesture on the game screen, and, at the same time, accepts a second operation as input by allowing the player to select any two or more areas from the multiple unit areas in a successive manner; and a character action determination processing unit which, upon acceptance of the first operation or the second operation as input, determines the action that the character is directed to perform in the character area respectively in response to the first operation and the second operation.

Such an information processing device can improve the operating characteristics of character manipulation on touchscreen panels while at the same time providing a compact display of the control areas on the game screen.

Embodiments

Configuration of Player Terminal 1

FIG. 1 is a schematic diagram showing an exemplary configuration of a player terminal 1. The player terminal 1 according to this embodiment is an information processing device, such as a smartphone, a tablet terminal, or the like. A character area 10*a* and a control area 10*b* are displayed on a game screen 10 which is displayed on the player terminal 1. A player-operated player character 14, a hit point gauge 15, which shows a hit point parameter configured in the player character 14, a point gauge 16 used for lethal technique activation, and a time counter 17, which measures play time, are located in the character area 10*a*. Multiple control buttons, which are an example of the unit areas, are located in the control area 10*b*. As shown in FIG. 1, in the present embodiment, there are nine control buttons 11-13, 21-23, and 31-33, which are arranged in three rows and three columns.

Figure 2:
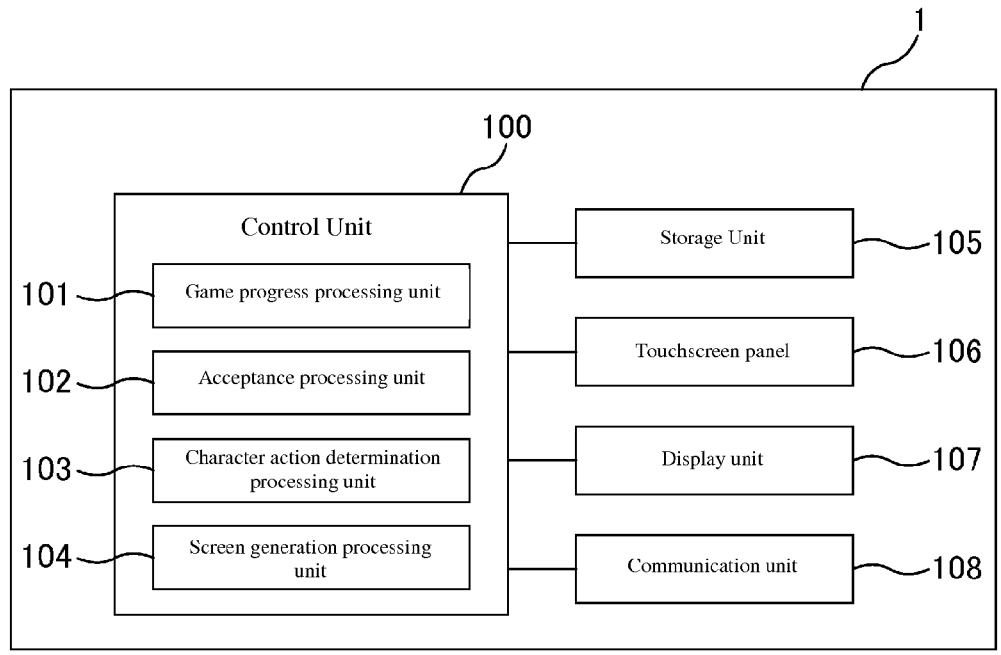
FIG. 2 A block diagram showing the functional configuration of the player terminal 1.

FIG. 2 is a block diagram showing the functional configuration of the player terminal 1. The player terminal 1 according to this embodiment has a control unit 100, a storage unit 105, a touchscreen panel 106, a display unit 107, and a communication unit 108.

The control unit 100 which, along with forwarding data between the components, exercises overall control over the player terminal 1, is implemented by using a CPU (Central Processing Unit) to run a predetermined program stored in memory (e.g., non-transitory computer readable medium including instructions stored in the memory that are executed by the CPU). The control unit 100 of the present embodiment is provided with a game progress processing unit 101, an acceptance processing unit 102, a character action determination processing unit 103, and a screen generation processing unit 104.

The game progress processing unit 101 possesses functionality for carrying out processing required to control game progress. The game progress processing unit 101 of the present embodiment controls the progress of a match-type fighting game, in which a player character is actuated in response to a player's operations on a battlefield configured in a virtual space in order to decide the winner of a battle with an opponent character.

The acceptance processing unit 102 possesses functionality for carrying out processing required to accept input produced by various operations performed by the player from the touchscreen panel 106. When the player selects any single button from the control buttons located in the control area 10*b*, the acceptance processing unit 102 of the present embodiment accepts a first operation as input if a single control button is selected, and accepts a second operation as input if three or more control buttons are selected in a successive manner.

The character action determination processing unit 103 possesses functionality for carrying out processing required to determine the actions of the player character based on the player's operations. The character action determination processing unit 103 of the present embodiment determines the actions that the player character is directed to perform respectively in response to the first operation and the second operation.

The screen generation processing unit 104 possesses functionality for carrying out processing required to generate screen data used to display a game screen on the display unit 107.

The storage unit 105, which has a ROM (Read Only Memory), i.e. a read-only storage area, in which operating system software is stored, and a RAM (Random Access Memory), i.e. a rewritable storage area used as a work area for arithmetic processing by the control unit 100, is implemented using a flash memory, a hard disk, or another non-volatile storage device. The storage unit 105 of the present embodiment stores the game program of the match-type fighting game and various types of data utilized in the match-type fighting game.

The touchscreen panel 106, which is in an example of an operation input unit used by the player to enter various operations (first operation, second operation, and other game operations), detects touch gestures performed by the player on the game screen 10 displayed on the display unit 107.

The display unit 107, which is used to display a game screen in response to commands from the control unit 100, is implemented, for example, as a liquid crystal display (LCD: Liquid Crystal Display), or the like.

The communication unit 108, which is used for exchanging information with a server device or other player terminals and the like, possesses receiver functionality for receiving various types of data and signals transmitted from the server device, etc., and transmitter functionality for transmitting various types of data and signals to the server device, etc., in response to commands from the control unit 100.

Operation of Player Terminal 1

First Character Action Determination Process

When the game screen 10 illustrated in FIG. 1 is displayed on the player terminal 1, a tap gesture performed by the player on the touchscreen panel 106 results in selecting a single control button from the nine control buttons located in the control area 10b, as a result of which the acceptance processing unit 102 accepts a first operation as input. When the first operation is accepted as input by the acceptance processing unit 102, the player terminal 1 executes a first character action determination process. It will be described in detail below.

Figure 3:
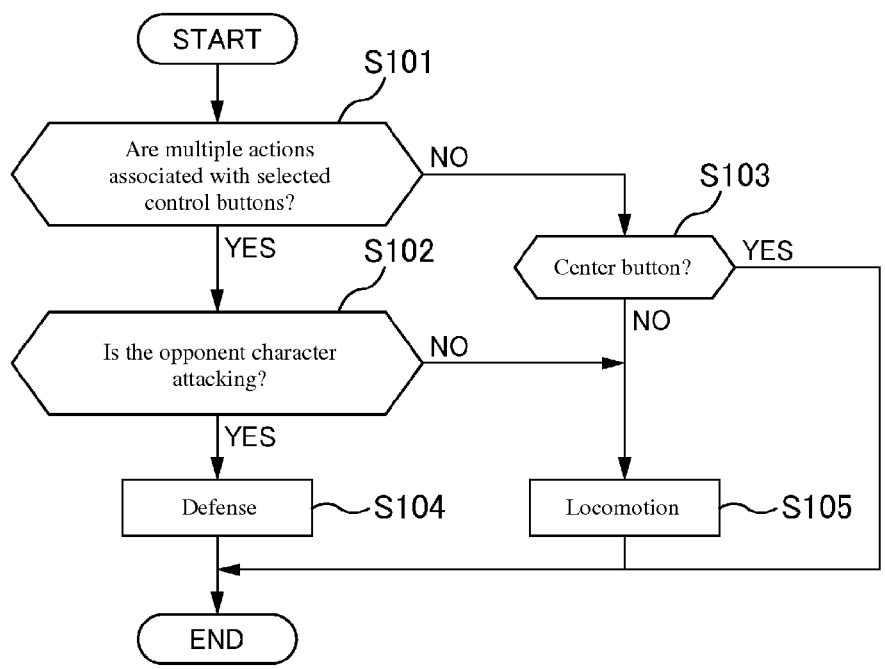
FIG. 3 A flow chart illustrating a first character action determination process.

FIG. 3 is a flow chart illustrating the first character action determination process. FIG. 4 is a diagram illustrating the correspondence between the first operation and the actions of the character.

First of all, as shown in FIG. 3, the character action determination processing unit 103 uses detection information from the touchscreen panel 106 to identify the single control button selected by the player and determines whether or not multiple actions are associated with this single control button (S101). As shown in FIG. 4, in the present embodiment, all the control buttons, with the exception of the control buttons 12, 22, and 32, have multiple actions (locomotion & defense) associated therewith in advance. Subsequently, if it is determined that there are multiple actions associated with the selected single control button (S101: YES), the process advances to Step 102, and if it is determined that there are no multiple actions associated therewith (S101: NO), the process advances to Step 103.

At Step 102, the character action determination processing unit 103 uses a character control signal from the game progress processing unit 101 to determine whether or not the opponent character is attacking (S102). Subsequently, if the opponent character is in fact attacking (S102: YES), the character action determination processing unit 103 determines that the action that the player character 14 is directed to perform is "defense" (S104). On the other hand, if the opponent character is not attacking (S102: NO), it determines that the action that the player character 14 is directed to perform is "locomotion" (S105).

Specifically, as shown in FIG. 1 and FIG. 4, if it is assumed that only the control button 11 has been selected by the player with a tap gesture, then it is determined that the action of the player character 14 is "defending against attack from the right side" if the opponent character is attacking, and determined that the action of the player character 14 is "jumping to the left" if the opponent character is not attacking. It should be noted that, as shown in FIG. 4, if the control buttons 11, 21, and 31, and the control buttons 13, 23, and 33, which are located in the first and third column, are selected from the nine control buttons arranged in three rows and three columns, it is determined that the action of the player character 14 is an action associated with the horizontal direction. In addition, if the control buttons 11-13 and the control buttons 31-33, which are located in the first and third row, are selected, then it is determined that the action of the player character 14 is an action associated with the vertical direction.

At Step 103, the character action determination processing unit 103 uses detection information from the touchscreen panel 106 to determine whether the single control button selected by the player is the center button (i.e., the control button 22) (S103). Subsequently, if it is determined by the character action determination processing unit 103 that it is the center button (control button 22) (S103: YES), the process is terminated without determining the action of the player character 14. On the other hand, if it is not the center button (control button 22) (S103: NO), the character action determination processing unit 103 determines that the action that the player character 14 is directed to perform is "locomotion" (S105). For example, as shown in FIG. 1 and FIG. 4, if it is assumed that only the control button 12 has been selected by the player with a tap gesture, then it is determined that the action of the player character 14 is "jumping up vertically".

After that, the screen generation processing unit 104 acquires motion data corresponding to the action determined by the character action determination processing unit 103 from the storage unit 105 and generates a game screen, on which the player character 14, acting in accordance with this motion data, is placed in the character area 10a.

Second Character Action Determination Process

When the game screen 10 illustrated in FIG. 1 is displayed on the player terminal 1, a swipe gesture performed by the player on the touchscreen panel 106 results in successively selecting any three or more control buttons from the nine control buttons located in the control area 10b, as a result of which the acceptance processing unit 102 accepts a second operation as input. When the second operation is accepted as input by the acceptance processing unit 102, the player terminal 1 executes a second character action determination process. It will be described in detail below.

Figures 6, 7:
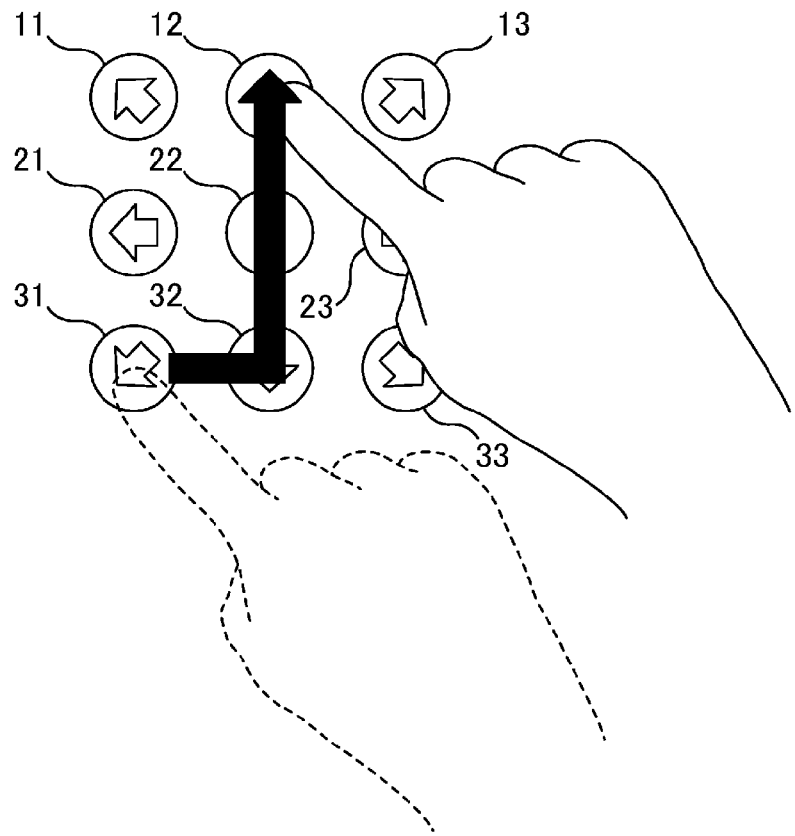
FIG. 6 A diagram illustrating the correspondence between a second operation and the actions of the character.
FIG. 7 A diagram illustrating an exemplary second operation.

FIG. 5 is a flow chart illustrating the second character action determination process. FIG. 6 is a diagram illustrating the correspondence between the second operation and the actions of the character. FIG. 7 is a diagram illustrating an exemplary second operation.

First of all, as shown in FIG. 5, the character action determination processing unit 103 uses detection information from the touchscreen panel 106 to identify the three or more control buttons successively selected by the player and determines whether or not a character action is associated with this combination of control buttons (S201). As shown in FIG. 6, in the present embodiment, attack actions are associated with control button combinations in advance. Two types of attack actions, i.e. regular attacks and special attacks, are configured here. The special attacks are configured to have a higher level than the regular attacks and their attack strength values are also larger. In addition, a selection order is also configured for these control button combinations. Furthermore, the control button combinations are configured such that the larger the number of the control buttons forming a combination, the higher its attack level and the larger its attack strength value.

Subsequently, if it is determined that a character action is associated with the combination of successively selected control buttons (S201: YES), the process advances to Step 201, and if it is determined that no character actions are associated therewith (S2101: NO), the process is terminated without determining the action of the player character 14.

Next, at Step 202, the character action determination processing unit 103 refers to the player's point gauge (lethal technique parameter) recorded in the storage unit 105 and determines whether or not this point gauge has reached a maximum value (MAX) (S202). Subsequently, if the point gauge has reached a maximum value (S202: YES), the character action determination processing unit 103 determines that the action that the player character 14 is directed to perform is a "special attack" (S203). On the other hand, if the point gauge has not reached a maximum value (S202: NO), it determines that the action that the player character 14 is directed to perform is a "regular attack" (S204).

Specifically, if it is assumed that the control button 31, control button 32, control button 22, and control button 12 have been successively selected by the player with a swipe gesture as shown in FIG. 1, FIG. 6, and FIG. 7, then it is determined that the action of the player character 14 is a "rising uppercut" if the player's point gauge 16 has not reached a maximum value, and determined that the action of the player character 14 is a "strong rising uppercut" if the player's point gauge 16 has reached a maximum value. In this manner, the action that the character is directed to perform is determined depending on the combination of control buttons successively selected from the nine control buttons arranged in three rows and three columns.

After that, the screen generation processing unit 104 acquires motion data corresponding to the action determined by the character action determination processing unit 103 from the storage unit 105 and generates a game screen, on which the player character 14, acting in accordance with this motion data, is placed in the character area 10a.

As discussed above, in accordance with the game program of the present embodiment, if a first operation is accepted as input by allowing the player to select any single button among the multiple control buttons with a tap gesture on the game screen 10, the player character 14 can be directed to perform an action corresponding to the first operation, and, at the same time, if a second operation is accepted as input by allowing the player to successively select any three or more buttons from the multiple control buttons with a swipe gesture on the game screen 10, the player character 14 can be directed to perform an action corresponding to the second operation. Subsequently, as a result, both when the player character 14 is directed to perform an action corresponding to a first operation and when the player character 14 is directed to perform an action corresponding to a second operation, the only thing the player needs to do is perform a touch gesture in the control area 10b having multiple control buttons located therein, thereby making it possible to improve the operating characteristics of character manipulation on the touchscreen panel 106. In addition, there is no need to display images separately for each functionality at a certain distance from each other in the horizontal direction of the game screen, as is the case with the conventional cursor keys and attack buttons, and displaying the control area 10b, which is made up of nine control buttons, at a single location, makes it possible to maintain the functionality of the conventional cursor keys and the attack buttons while being able to provide a more compact display, and, at the same time, ensuring simple operation with one hand.

Other Embodiments

The foregoing embodiment was intended to facilitate the understanding of the present invention and is not to be construed as limiting of the present invention. The present invention can be modified and improved without departing from its spirit and the present invention includes equivalents thereto. In particular, the embodiments described below are also included in the present invention.

Second Operation Input

Although the present embodiment, as described above, has been discussed with reference to a case in which successively selecting three or more control buttons from the nine control buttons located in the control area 10b causes the acceptance processing unit 102 to accept a second operation as input, the present invention is not limited thereto. For example, the acceptance processing unit 102 may accept a second operation as input as a result of two or more control buttons being selected in a successive manner. Specifically, it may be configured to determine that the action of the player character 14 is a "weak upper punch" when two control buttons, i.e. control button 11 and control button 12, are successively selected by the player with a swipe gesture, and determine that the action of the player character 14 is a "strong upper punch" when three control buttons, i.e. control button 11, control button 12, and control button 13 are selected in a successive manner. It should be noted that there is a risk of erroneous operation if two control buttons are selected by the player in a successive manner. For this reason, successive selection of three or more control buttons is more advantageous than successive selection of two control buttons from the standpoint of being able to avoid situations in which the character ends up performing operations contrary to the player's intentions.

Special Attacks

Although the present embodiment, as described above, has been discussed with reference to a case in which a process designed to determine whether or not the point gauge has reached a maximum value (MAX) is executed at Step 202 in the flow chart of FIG. 5, in the present invention, this determination process may be omitted.

In addition, in the present embodiment, as described above, a lethal technique button may be located in the control area 10b separately from the nine control buttons. Specifically, if the point gauge reaches a maximum value (MAX) and the player selects the lethal technique button with a tap gesture, the character action determination processing unit 103 determines that the action that the player character 14 is directed to perform is a "special attack".

Display of Control Area 10*b*

In the present embodiment, as described above, the mode in which the nine control buttons located in the control area 10*b* are displayed can be changed.

Figure 8:
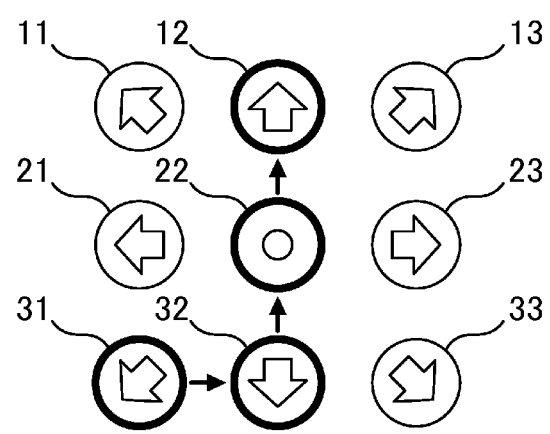
FIG. 8 A diagram illustrating the way control buttons are displayed.

Specifically, as shown in FIG. 8, the screen generation processing unit 104 can highlight the control button 31, control button 32, control button 22, and control button 12, thereby allowing for a combination of control buttons to function as a guidance display used to inform the player. At such time, displaying the images of the arrows in the same location can help inform the player of the order of selection. In particular, at the point in time when the player touches the control button 31, the screen generation processing unit 104 may select and respectively highlight multiple combinations of control buttons in which said control button 31 is designated as the initial node (for example, a combination of the control button 31, control button 32, control button 22, and control button 12, or a combination of the control button 31, control button 32, and control button 33).

In addition, specifically, when a player is battling another player acting as an opponent (the opponent may even be an NPC), the screen generation processing unit 104 may highlight the control button 31, control button 32, control button 22, and control button 12, as shown in FIG. 8, thereby making them function as a display that informs the player of the control button combination selected by the other player. As a result, just by looking at a single control area, the player can learn about an attack prepared by the other player in advance and perform selection operations intended for his or her own attack or defense.

Configuration of Control Area 10*b*

Although the present embodiment, as described above, has been discussed with reference to the control area 10*b* formed by arranging nine control buttons 11-13, 21-23, and 31-33 in three rows and three columns, as shown in FIG. 1, the present invention is not limited thereto. For example, it may be formed by arranging the control buttons in four rows and four columns, or in five rows and five columns.

In addition, although the present embodiment, as described above, has been discussed with reference to a case in which no determination is made about the action of the player character 14 when the center button (control button 22) is selected by the player with a tap gesture, the present invention is not limited thereto. For example, certain actions may be associated with the center button (control button 22).

Successive Attacks

In the present embodiment, as described above, attack actions corresponding to control button combinations selected by the player as a result of swipe gestures performed by the player may be determined in a successive manner. Specifically, when a first combination of control buttons is selected by the player with a swipe gesture and then a second combination of control buttons is selected via the center button (control button 22), the character action determination processing unit 103 first determines a first attack corresponding to the first combination and then determines a second attack corresponding to the second combination. In this manner, interposing the selection of the center button (control button 22) between the selection of one attack technique and another attack technique makes it possible to determine the actions of the character in a successive manner, without taking one's finger off the game screen. In other words, the center button (control button 22) can be operated as a button used for attack technique switching. It should be noted that it is not operated as a button for attack technique switching if the combination of control buttons is composed of four or more control buttons including the center button (for example, a combination produced by selecting the control button 31, control button 32, control button 22, and control button 12 in a successive manner) and passes through the center button (control button 22).

Player Terminal 1

Although the present embodiment, as described above, has been discussed with reference to smartphones, tablet terminals, and other information processing devices, the present invention is not limited thereto and applies to any information processing devices that have at least a touchscreen panel. It should be noted that the player terminal 1 used in the present embodiment is an example of a computer.

Figure 9:
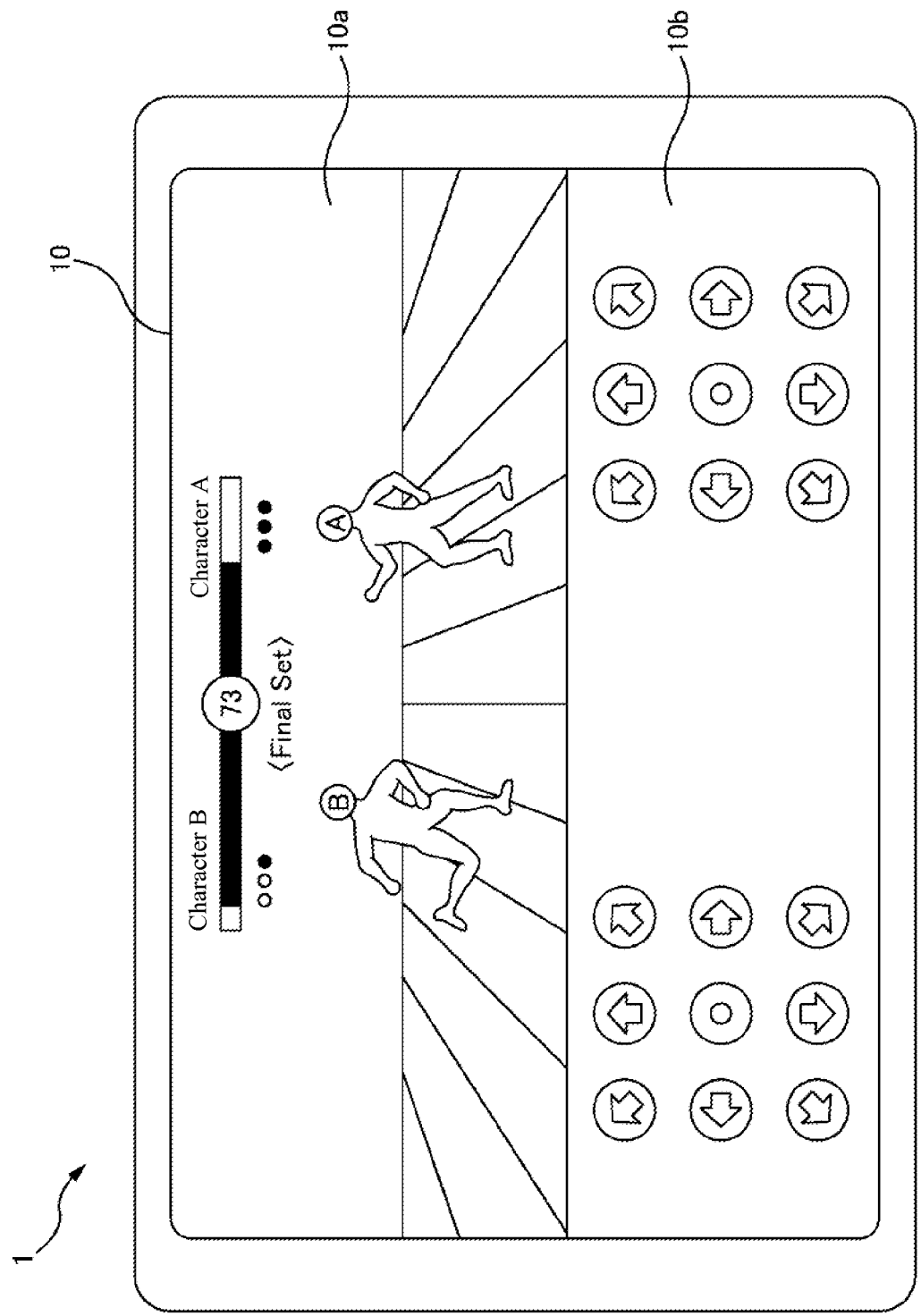
FIG. 9 A schematic diagram showing another exemplary configuration of the player terminal 1.

In addition, although the present embodiment, as described above, has been discussed with reference to a single player who plays a game using a single player terminal 1, the present invention is not limited to such cases and is also applicable to situations in which multiple players play games using a single player terminal 1. Specifically, as shown in FIG. 9, placing nine control buttons intended for use by multiple players in the control area 10*b* allows for two players to play against or with each other using a single player terminal 1.

In addition, in the present embodiment, as described above, using the communication functionality of the player terminal 1 (infrared communication, and the like) allows for multiple players to engage in inter-device communication-based game play against or with each other using their own player terminals 1.

DESCRIPTION OF THE REFERENCE NUMERALS

1 Player terminal
10 Game screen
10*a* Character area
10*b* Control area
11-13 Control buttons
14 Player character
15 Hit point gauge
16 Point gauge
17 Time counter
21-23 Control buttons
31-33 Control buttons
100 Control unit
101 Game progress processing unit
102 Acceptance processing unit
103 Character action determination processing unit
104 Screen generation processing unit
105 Storage unit
106 Touchscreen panel
107 Display unit
108 Communication unit

The invention claimed is:

1. A non-transitory computer readable medium including instructions stored in a memory, the instructions executable on a processor to run a game by responding to a player's operations on a touchscreen panel, wherein said instructions directs the processor to execute:
   a screen generation process, which generates a game screen including a character area having player-operated characters located therein and a control area having multiple player-selectable unit areas located therein in a grid-like configuration, each of the multiple player-selectable unit areas indicative of a direction for character movement;
   an acceptance process, which accepts a first operation as input by allowing the player to select one of the unit areas from the control area with a touch gesture in the control area displayed on the game screen, and, at the same time, accepts a second operation as input by allowing the player to select two or more adjacent unit areas in the control area in a successive manner; and
   a character action determination process which, upon acceptance of the first operation or the second operation as input, invokes the action that the character is directed to perform in the character area respectively in response to the first operation and the second operation,
   wherein the action corresponding to the first operation is selected from a plurality of locomotion actions, and wherein the action corresponding to the second operation is selected from a plurality of attack actions.

2. The non-transitory computer readable medium according to claim 1 wherein, upon acceptance of the second operation as input during the acceptance process, the character action determination process determines that the action that the character is directed to perform is an action of a higher level as the number of the unit areas successively selected by the player is increased.

3. The non-transitory computer readable medium according to claim 1 wherein, upon acceptance of the second operation as input during the acceptance process, the character action determination process determines the action that the character is directed to perform only if the number of the unit areas successively selected by the player is three or more.

4. The non-transitory computer readable medium according to claim 1, wherein
   the control area is formed by arranging nine unit areas in three rows and three columns, and
   the character action determination process,
   upon acceptance of the first operation as input during the acceptance process, determines that the action that the character is directed to perform is an action associated with the horizontal direction if the unit areas located in either of the first or third column are selected from among the nine unit areas arranged in three rows and three columns, and, at the same time, determines that the action that the character is directed to perform is an action associated with the vertical direction if the unit areas located in either of the first or third row are selected, and
   upon acceptance of the second operation as input during the acceptance process, determines the action that the character is directed to perform depending on the combination of the unit areas successively selected from the nine unit areas arranged in three rows and three columns.

5. An information processing device running a game by responding to a player's operations on a touchscreen panel, wherein said information processing device is provided with
   a screen generation processing unit, which generates a game screen including a character area having player-operated characters located therein and a control area having multiple player-selectable unit areas located therein in a grid-like configuration, each of the multiple player-selectable unit areas indicative of a direction for character movement;
   an acceptance processing unit, which accepts a first operation as input by allowing the player to select one of the unit areas from the control area with a touch gesture in the control area displayed on the game screen, and, at the same time, accepts a second operation as input by allowing the player to select two or more adjacent unit areas in the control area in a successive manner; and
   a character action determination process which, upon acceptance of the first operation or the second operation as input, invokes the action that the character is directed to perform in the character area respectively in response to the first operation and the second operation;
   wherein the action corresponding to the first operation is selected from a plurality of locomotion actions, and wherein the action corresponding to the second operation is selected from a plurality of attack actions.

* * * * *